United States Patent Office 3,834,943
Patented Sept. 10, 1974

3,834,943
ELECTROLYTE-ELECTRODE UNIT FOR SOLID-ELECTROLYTE FUEL CELL AND PROCESS FOR THE MANUFACTURE THEREOF
Paul Van den Berghe, Satigny, and Helmut Tannenberger, Geneva, Switzerland, assignors to Compagnie Francaise de Raffinage, Paris, France
No Drawing. Filed June 16, 1972, Ser. No. 263,600
Claims priority, application Switzerland, June 18, 1971, 8,911/71
Int. Cl. H01m 27/00
U.S. Cl. 136—86 D
11 Claims

ABSTRACT OF THE DISCLOSURE

Method and apparatus to improve a fuel cell operating in the range of 800 to 1100° C., the gas-impermeable solid electrolyte preferably being formed of stabilized zirconia with a suitable metal anode and a cathode formed of at least one layer of doped indium oxide affixed to the electrolyte. The improvement consisting of having the doped indium oxide layer formed with dendrites whose principal axes are at least approximately perpendicular to the surface of the electrolyte with the axes forming trunks having a diameter of between 500 and 10,000 A., so that said doped indium oxide layer is permeable to gas and the thickness is at most equal to 0.02 cm. The improvement also includes the method of obtaining such a doped indium oxide layer with dendrites by utilizing an electron beam to vaporize a target of the doped indium oxide and condense the latter on the electrolyte which has been heated to at least 300° C. under total gas pressure of between $10^{-6}$ and $10^{-2}$ mm. Hg, containing an oxygen partial pressure of at least $10^{-6}$ mm. Hg. A further improvement of the foregoing includes the use of a chromite layer between the electrolyte and the indium oxide layer to prevent the diffusion of the one into the other.

---

The method and apparatus of the present invention concerns an electrolyte-electrode unit for fuel cell intended to operate at high temperature, and more particularly concerns a hermetic body of solid electrolyte which is a conductor of oxygen ions at high temperature, and an electrode formed of at least one layer of doped indium oxide covering a part of the surface of the electrolyte and adhering to it.

Such units are already known in which the electrode is intended to operate as a cathode, associated with a solid electrolyte of stabilized zirconia and a suitable metal anode, for instance a nickel anode, in a fuel cell having an operating temperature of about 800 to 1100° C.

The effective use of doped indium oxide to form the cathode in such a fuel cell, if it can be achieved, constitutes an important advance over the prior art. Doped indium oxide is a relatively inexpensive material which is insensitive to the combustion supporting gas. Even at the high operating temperatures of the cell, it has good chemical compatibility with stabilized zirconia and has a coefficient of thermal expansion close to that of the latter. Moreover, its electrochemical properties are comparable to those of the metal which are best suited, namely the precious metals. The result is that the use of a doped indium oxide cathode instead of a cathode of precious metal, for instance platinum or silver, in a fuel cell of the type indicated above makes it possible considerably to improve the life and dependability in operation thereof while lowering the cost of its manufacture.

However, the practical embodiment of a fuel cell comprising a doped indium oxide cathode and having electrical properties comparable to those of cells comprising a cathode of precious metal, and also having a rather high power/weight ratio, encounters the following obstacle which up to new appeared to be unsurmountable.

In order to make it possible to obtain a sufficient power/weight ratio, it is necessary that the thickness of the layer of doped indium oxide not exceed a value of about 150 to 200 microns. This limitation seems to result in the necessity of making the indium oxide layer in compact form so that its actual resistivity does not excessively exceed the theoretical resistivity of the material itself. As a matter of fact, the value of the latter is only slightly less than the maximum value of resistivity for which the lateral resistance (resistivity/thickness ratio) of a layer, having a thickness not exceeding the upper limits indicated above, would be sufficiently small to permit the drainage of the electrical current produced by the cell without the aid of a metallic current-collecting layer.

Now, a compact structure of the doped indium oxide layer is incompatible with good electrochemical operation of the cell. As a matter of fact, it is indispensable for said layer to have good permeability to the combustion supporting gas in order to permit the latter readily to arrive in contact with the electrolyte. A compact structure furthermore would not be satisfactory from the point of view of the number of electrochemically active triple points, that is to say, parts of the electrode in which the gas, in the present case the combustion supporting gas, is simultaneously in contact with the electrode and the electrolyte. In order for the number of triple points to be sufficient, in other words, for the active surface/total surface ratio of the electrode to be sufficiently high, it is important that the electrode have, at least in the part thereof which is in contact with the electrolyte, as fine a granular structure as possible.

It therefore seemed that a layer of doped indium oxide having good permeability to gases and a fine porous structure which are indispensable for proper electrochemical operation of the cell would have too high a resistivity to permit its use with a thickness low enough for the weight/power ratio of the cell to be tolerable.

An object of the invention is specifically to make it possible to reconcile the above requirements by simultaneously conferring all the necessary qualities on the cathode.

For this purpose, an electrolyte-electrode unit is constructed in accordance with the present invention by forming the layer of doped indium oxide with dendrites whose principal axes are at least approximately perpendicular to the surface of the electrolyte; these axes forming trunks having a diameter of between 500 and 10,000 A., so that said layer is permeable to gas; and by having the thickness of this layer at most equal to 0.02 cm.

It is due to the very special structure which has just been defined that the electrode forming part of the electrolyte-electrode unit has a sufficient permeability to gases and a particularly high ratio of active surface to total surface while having a sufficiently low resistivity, of less than $7.5 \times 10^{-3}$ ohm·cm., that its lateral resistance does not exceed 0.5 ohm (practical limit) for a thickness at most equal to 0.015 cm.

In a variant of the electrolyte-electrode unit, according to an alternative embodiment of the present invention, the electrode comprises, between the electrolyte and the doped indium oxide layer, a porous layer formed of granules of at least one chromite of at least one element selected from among the rare earths and yttrium, of the general formula:

in which T represents at least one rare earth or yttrium or a mixture of these elements, $x$, $a$ and $b$ being numbers between 0 and 1 which can assume a value of 0 and the values of which satisfy the equation $a+b=x$, these granules being fastened to the electrolyte over at least a part of the surface thereof in contact with it, the indium layer being arranged in such a manner as to form an electric contact between all of these granules.

The presence of the chromite layer eliminates the risk of diffusion of the indium oxide into the electrolyte and moreover increases the adherence of the layer of indium oxide on the surface of the electrolyte. Thus, this layer further improves the life and the reliability in operation of the cell. Furthermore, this layer increases the catalytic activity of the cathode, which improves the performance of the cell, all other things being equal.

As the doping element for the indium oxide one may include at least one of the elements whose use is already known; particularly antimony, tellurium, gallium, zinc, tin, cadmium, germanium, tantalum, titanium, tungsten, chlorine and fluorine.

The doping element is preferably tin and more particularly in a proportion of between 1 and 5 atom percent, referred to the total number of indium and tin atoms.

As solid electrolyte, which is a conductor of oxygen ions at high temperature, there may be used any known suitable material, for example, zirconia stabilized in the form of a cubic solid solution comprising, in addition to $ZrO_2$ and a certain proportion of hafnium oxide coming from the presence of the latter element in zirconium ores, at least one stabilizing oxide selected, for instance, from among oxides of the elements Ca, Y, Sc, rare earths and mixtures of said oxides, in particular mixtures of rare earth oxides.

With respect to the shape of the hermetic body of solid electrolyte, it may be any of the known shapes, such as that of a disk, tube, etc. The dimensions of this body, and in particular its thickness, may also be selected freely in accordance with the general configuration of the cell, respecting the known criteria applicable to the construction of this type of cell.

Preferably the porous chromite layer is formed of a chromite or a mixture of rare earth chromite having a coefficient of expansion which is as close as possible to that of the electrolyte. Thus, for instance, in the event that the electrolyte is stabilized zirconia, one preferably employs lanthanum chromite and more particularly lanthanum chromite doped with strontium, particularly the one having the formula:

$$La_{0.8}Sr_{0.2}CrO_3$$

The average dimensions of the chromite granules are preferably of the order of 0.05 to 2 microns and the thickness of the intermediate layer formed by these granules is between about 0.5 and 2 microns.

Another embodiment of the invention is a method of manufacturing the electrolyte-electrode unit which has just been described. This method is characterized by placing in a hermetic enclosure a target (having the composition which it is desired to confer upon the layer of doped indium oxide) and the electrolyte, reducing the pressure prevailing in the enclosure down to a total gas pressure of between $10^{-6}$ and $10^{-2}$ mm. Hg, containing an oxygen partial pressure of at least $10^{-6}$ mm. Hg, heating the electrolyte at least equal to 300° C., and vaporizing the material of the target by electronic bombardment in such a manner as to obtain a deposit of a doped indium oxide layer on the surface of the electrolyte.

The power of the beam of electrons used to effect the electronic bombardment is preferably adjusted to a value sufficient to obtain a rate of growth in thickness of the indium oxide layer of between 1 and 10 microns per minute.

During the depositing, the electrolyte can be given a suitable displacement, for instance a rotation around an axis and/or an oscillation parallel to a given direction, which may be identical with the axis of rotation, in order to obtain good homogeneity and uniform thickness of the layer of doped indium oxide which is deposited on the electrolyte.

One can also in known manner impart any suitable displacement to the target with respect to the impact of the beam of electrons, for instance a spiral displacement of said impact on the target, particularly for having a uniform target temperature during the deposition.

In accordance with one particular embodiment of the method described above, the purpose of which is to manufacture an electrolyte-electrode unit according to the variant in which the electrode comprises, in addition to the indium oxide layer, also a porous layer of chromite, one operates in the following manner:

Into a hermetic enclosure there is placed a target formed of at least one chromite of at least one element selected from the rare earths and yttrium, of the general formula:

$$T_{1-x}Sr_aCa_bCrO_3$$

in which T represents at least one rare earth or yttrium, or a mixture of these elements, $x$, $a$ and $b$ being numbers between 0 and 1, which can assume a value of 0 and which satisfy the equation $a+b=x$, and the electrolyte. The pressure prevailing in the enclosure is decreased to a pressure close to $10^{-4}$ mm. Hg. The electrolyte is heated to a temperature at least equal to 300° C. The material of the target is vaporized by electronic bombardment so as to deposit a layer formed of chromite granules on the surface of the electrolyte. Whereupon a layer of doped indium oxide of dentritic structure is deposited on the free surface of said layer, proceeding in the manner described above. Finally, at least the layer of chromite is fired at a temperature of between 600 and 1400° C. after the depositing of the intermediate layer or after the depositing of the layer of indium oxide.

Of course, the method corresponding to this particular embodiment could, without difficulty, be applied to the manufacture of an electrolyte-electrode unit in which the electrode would include instead of a layer of indium oxide, a layer of another material, for instance of a metal. For this purpose it would be sufficient, after having deposited the layer of chromite, as indicated above, to deposit on top of said layer a layer of metal of suitable thickness by vaporization-condensation under vacuum in known manner, using the same hermetic enclosure as for the deposit of the chromite layer. This would make it possible in particular to produce an electrolyte-electrode unit having the structure described in Swiss Pat. No. 512,825.

EXAMPLE 1

A sintered body of indium oxide doped with tin, of a composition corresponding to a mixture containing 98 mol percent $In_2O_3$ and 2 mol percent $SnO_2$, in the form of a cylinder of 20 mm. diameter and 40 mm. height, intended to serve as target, is prepared in the following manner: the two above oxides are mixed together in the form of fine powders while crushing them together so as further to reduce their particle size to an average value of the order of 20 to 50 microns. A cylinder corresponding to the final dimensions desired is then formed by isostatic pressing, and this cylinder is sintered at 1000° C. in an air atmosphere for 12 hours.

As electrolyte there is used a tube of zirconia stabilized with ytterbium, having the molar composition of $ZrO_2$ ($HfO_2$) 90 mol percent; $Yb_2O_3$ 10 mol percent, and a length of 20 mm. outside diameter of 8 mm., and thickness of 0.2 mm.

The target and the electrolyte tube are placed in a vacuum evaporation-condensation apparatus comprising essentially a hermetic bell within which the pressure can, by means of a suitable pumping device, be brought to and maintained at a pressure not exceeding $2\times10^{-6}$ mm. Hg, and an electron gun capable of delivering a beam having a maximum power of 2 kw. with a diameter of 16 mm. at the point of impact on a target.

The doped indium oxide cylinder constituting the target is placed with its axis vertically on a support formed of a small copper crucible cooled by internal circulation of cold water. The electrolyte tube is placed on a moving heating support which imparts to it a movement of rotaton at a speed of 1 r.p.m. around its axis at an average distance of 10 cm. from the target, the axis of the tube being horizontal. A removable mask is interposed, at the start of the operations, between the target and the electrolyte tube.

The air is first of all removed from the vacuum enclosure down to a pressure of $2 \times 10^{-6}$ mm. Hg, whereupon a stream of pure oxygen is introduced so as to increase the pressure to $10^{-4}$ mm. Hg. The bombardment of the target is then started with a beam power equal to 1 kw., the impact on the target having an area of 200 mm.$^2$. In this way the temperature of the target in the region around the impact is brought to about 1000° C., which temperature is maintained for 10 minutes. The power of the electron beam is then brought to 2 kw. so as to increase the temperature of the target within the the zone of impact to about 2000° C. The pressure is allowed to rise by itself to $10^{-3}$ mm. Hg in the enclosure and the mask is retracted so as to place the electrolyte tube in sight of the target. The surface temperature of the electrolyte is maintained at about 600° C. In this way a homogeneous, microporous, dendritic layer of a very uniform thickness is deposited on the entire outer surface of the electrolyte tube with a rate of deposition of between 5 and 10 microns per minute. At the end of 20 minutes there is thus obtained a layer of a total thickness of 150 microns. The very uniform dendritic structure of this layer is shown by examination with an electron microscope with stereoscopic sweep.

EXAMPLE 2

The same procedure was used as in Example 1, but instead of depositing the layer of indium oxide doped with tin directly on the surface of the solid electrolyte tube, there was first deposited on said surface a layer of lanthanum chromite doped with strontium, having a composition corresponding to the formula $La_{0.8}Sr_{0.2}CrO_3$, with constant thickness of about 2 microns, covering the entire outer surface of the electrolyte tube.

For this purpose, a target of lanthanum chromite doped with stronium having the composition indicated above was first of all prepared by sintering in the form of a cube having a side of 1 cm.. For the preparation of this target, the following procedure was employed:

Lanthanum oxide $La_2O_3$ and strontium nitrate $Sr(NO_3)_2$ were homogeneously mixed in the form of powders in proportions corresponding to an atomic ratio of lanthanum to stronium of 4, and this mixture was calcined in air at 600° C. until no further nitrous vapors were given off. To the resultant powder there was added an amount of chromium oxide $CrO_3$ in powder form corresponding to the atomic composition represented by the formula $La_{0.8}Sr_{0.2}CrO_3$ and the mixture of powder thus obtained was crushed so as to make it perfectly homogeneous while decreasing its particle size to an average value of the order of 30 microns.

A cylinder of dimensions corresponding to the final dimensions indicated above was then formed by isostatic pressing under a pressure of 50 tons/cm.$^2$ and this cylinder was sintered at 1600° C. in air for 2 hours. The cylinder was then again crushed in order to obtain a powder having a particle size of an average of about 100 microns, whereupon this powder was compressed under a pressure of 12 tons/cm.$^2$ so as to form a cube of a side of 1 cm. and this cube was sintered for 4 hours at 1900° C. in air.

The doped lanthanum chromite target was placed on the target support in the vacuum enclosure and a layer of doped lanthanum chromite having a thickness of about 2 microns was deposited on the outer surface of the tube of said solid electrolyte by evaporation-condensation under the following operating conditions:

Pressure within the enclosure _____ mm. Hg__ $10^{-4}$
Power of the beam of electrons ____watts/mm.$^2$__ 10
Distance between the target and the solid tube the solid electrolyte tube _____cm__ 18
Surface temperature of the electrolyte tube __° C__ 450

The other operating conditions are the same as in the case of the deposit of the doped indium oxide layer described in Example 1.

The electrolyte tube, covered with the layer of lanthanum chromite, was then heated in air for 2 hours at 950° C.

The layer of doped lanthanum chromite thus deposited on the electrolyte is formed of approximately spherical granules strongly adhering to the electrolyte and to each other, with an average diameter of about 0.5 micron, leaving between them communicating pores having approximately the same dimensions as the grains.

A layer of indium oxide of dendritic structure was deposited on the surface of said porous lanthanum chromite layer by the same procedure as indicated in Example 1.

Example 3

The same procedure was used as in Example 2, effecting in succession a deposit of a layer of lanthanum chromite and then of a layer of doped indium oxide, but instead of heating the tube in air after the depositing of the first layer, this operation was carried out under the same conditions as in Example 2 after the depositing of the doped indium oxide layer.

We Claim:

1. In a high temperature fuel cell, an improved electrolyte-electrode structure comprising a hermetic body of solid electrolyte which is a conductor of oxygen ions at high temperature, an electrode formed of at least one layer of doped indium oxide covering a part of the surface of the electrolyte and adhering thereto, said layer of doped indium oxide having dendrites formed therein, the principal axes of which dendrites are at least approximately perpendicular to the surface of the electrolyte, these axes forming trunks having a diameter of between 500 and 10,000 A., so that said layer is permeable to an oxygen containing gas, and the thickness of said layer is at most equal to 0.02 cm.

2. In a high temperature fuel cell of the character described, an improved electrolyte-electrode structure comprising a hermetic body of solid electrolyte which is a conductor of oxygen ions at high temperature, an electrode formed of at least one layer of doped indium oxide covering a part of the surface of the electrolyte and adhering thereto, said layer of doped indium oxide having dendrites formed therein, the principal axes of which dendrites are at least approximately perpendicular to the surface of the electrolyte, these axes forming trunks having a diameter of between 500 and 10,000 A., so that said layer is permeable to an oxygen containing gas, and the thickness of said layer is at most equal to 0.02 cm. having as a part of said electrode and formed between the electrolyte and said layer of doped indium oxide a porous layer formed of granules of at least one chromite of at least one element selected from among the rare earths and yttrium, of the general formula:

$$T_{1-x}Sr_aCa_bCrO_3$$

in which T represents at least one rare earth or yttrium, or a mixture of said elements, $x$, $a$ and $b$ being numbers between 0 and 1, and which may assume a value of 0 and satisfy the equation $a+b=x$, these granules being firmly attached to the electrolyte over at least a part of their surface in contact with it, the doped indium oxide layer being disposed in such a manner as to form an electric contact between all of these granules said chromite granules having a particle size of between 0.1 and 0.5 microns and the thickness of the layer formed by said chromite granules being between 0.5 to 2 microns.

3. A device according to Claim 1, wherein the said indium oxide is doped by at least one of the following elements: antimony, tellurium, gallium, zinc, tin, cadmium, germanium, tantalum, titanium, tungsten, chlorine and fluorine.

4. A device according to Claim 1, wherein the said indium oxide is doped by tin, the proportion of said latter element being at least 1% and at most 5% by atoms, referred to the total number of indium and tin atoms.

5. A device according to Claim 2, wherein the said chromite is $La_{0.8}Sr_{0.2}CrO_3$.

6. A device according to Claim 2, wherein the said indium oxide is doped by at least one of the following elements: antimony, tellurium, gallium, zinc, tin, cadmium, germanium, tantalum, titanium, tungsten, chlorine and fluorine.

7. A device according to Claim 5, wherein the said chromite granules have a particle size of between 0.1 and 0.5 microns and the thickness of the layer formed by said granules is between 0.5 and 2 microns.

8. A device according to Claim 6, wherein the said chromite is $La_{0.8}Sr_{0.2}CrO_3$.

9. A device according to Claim 3, wherein said doped indium oxide is a cathode, said electrolyte formed of stabilized zirconia and said fuel cell is designed for an operative range of 800° C. to 1100° C.

10. In a device according to Claim 1 wherein said fuel cell comprises a solid electrolyte of stabilized zirconia and a suitable metal anode and said electrode formed of doped indium oxide is a cathode.

11. In a device according to Claim 10 wherein said metal anode is made from nickel.

References Cited

UNITED STATES PATENTS 3,558,360   1/1971   Sverdrug et al., _____ 136—86 F

WINSTON A. DOUGLAS, Primary Examiner

H. A. FEELEY, Assistant Examiner

U.S. Cl. X.R.

136—86 F; 252—463